3,554,993
POLYMERIZATION CATALYST PROCESS
AND CATALYST
Charles W. Moberly and Gerald R. Kahle, Bartlesville, Okla., assignors to Phillips Petroleum Company, a corporation of Delaware
No Drawing. Filed Sept. 2, 1965, Ser. No. 484,717
Int. Cl. C08f 1/56
U.S. Cl. 260—93.7
5 Claims This invention relates to the polymerization of olefins to form solid polymers. In one aspect it relates to improved catalysts for such a polymerization. In another aspect it relates to a process for producing solid polymers of olefins so as to obtain improved yield, improved polymer flexural modulus and/or improved xylenes-soluble content of the polymer.

Polymers of alpha-olefins, particularly of propylene, have long been known and numerous procedures have been disclosed for their production. These polymers are characterized by a greater or lesser degree of stereospecificity, i.e., the presence of a certain amount of a crystalline component frequently designated as isotactic polymer. Many of the useful properties of these polymers such as ultimate tensile, hardness, range of melting temperatures, etc. appear to depend upon the stereospecificity of the polymer. Flexural modulus, a property readily measurable by standard procedures, provide a reliable and consistent means for characterizing these polymers. The higher the stereospecificity of a polymer, the higher the flexural modulus values are found to be. For a commercially attractive product, flexural modulus values must be high, preferably above 200,000 p.s.i. and more preferably above 225,000 p.s.i. Heretofore it has frequently been necessary to extract amorphous fractions of the polymer in order to provide products having flexural moduli in this range. It is therefore highly desirable to minimize the production of amorphous polymer, as measured for example by the amount of polymer soluble in mixed xylenes.

Another requirement for these polymerization procedures is a high level of productivity of polymer based on catalyst. The stereospecific catalyst systems used in these operations are expensive and cannot be regenerated. Thus, a high productivity in pounds of useful polymer per pound of catalyst is an important feature of any commercially attractive process.

An object of this invention is to provide an improved process for the production of olefin polymers.

Another object of this invention is to provide a polymerization process in which there is obtained an increase in polymer yield, an increase in flexural modulus and/or a decrease in the xylenes-soluble content of the polymer.

A further object of this invention is to provide novel catalyst systems which when employed in a polymerization process results in the improving of the polymer yield, flexural modulus and/or xylenes-solubles of the resulting polymer.

Other aspects, objects and the several advantages of this invention will be apparent to those skilled in the art upon consideration of this disclosure.

According to our invention we have discovered that 1-olefin polymers can be obtained in improved yields with increased flexural modulus and/or decreased xylenes-soluble content when the polymerization is conducted in the presence of an organometal modified catalyst system formed by admixing (A) an organoaluminum dihalide, $RAlX_2$, wherein R is an alkyl, cycloalkyl, or aryl group having from 1 to 20 carbon atoms and X is a halogen selected from the group consisting of fluorine, chlorine, bromine, and iodine, (B) a titanium trichloride-aluminum trichloride complex resulting from the reaction of titanium tetrachloride and aluminum and having the approximate formula $TiCl_3 \cdot \frac{1}{3} AlCl_3$, and (C) a compound selected from the group consisting of: (1) a substituted silane having the formula $(RO)xSiR'_{4-x}$ wherein R' is hydrogen or R, R is an alkyl, cycloalkyl or aryl radical having from 1 to 20 carbon atoms, and x is at least 1 and not more than 4; (2) triethylenediamine; (3) an N-organo-substituted phosphoramide of the formula $$(R_2N)_3P=O$$

wherein R is an alkyl, cycloalkyl or aryl radical having from 1 to 20 carbon atoms; (4) an onium halide compound of the formula $R_mZX$ wherein Z is nitrogen, phosphorous, oxygen or sulfur, X is a halogen selected from the group consisting of fluorine, chlorine, bromine, or iodine, $m$ is 3 or 4 and R is an alkyl, cycloalkyl or aryl radical having from 1 to 20 carbon atoms; (5) an amide of the formula (a)

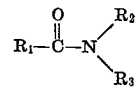

wherein $R_1$ is a radical selected from the group consisting of hydrogen, an alkyl radical containing 1 to 20 carbon atoms, phenyl, carboxyl, alkoxy, $-N(R_5)_2$ wherein each $R_5$ is an alkyl radical containing 1 to 4 carbon atoms, and

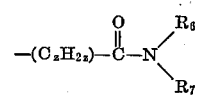

wherein z is an integer of 1 to 4, and $R_2$, $R_3$, $R_6$ and $R_7$ are radicals selected from the group consisting of H, alkyl radical containing 1 to 8 carbon atoms, phenyl and cyclohexyl,

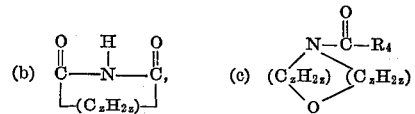

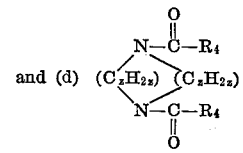

wherein z is an integer of 1 to 4, and $R_4$ is a radical selected from the group consisting of alkyl radicals containing 1 to 4 carbon atoms and phenyl; (6) a silazane selected from the group consisting of $R_3Si-NR'-SiR_3$, $(R_3Si)_3-N$, $R_3Si-NR'-SiR_2-NR'-SiR_3$ and $$R'(R_2SiNH)_yR'$$

wherein R is an alkyl, cycloalkyl, or aryl radical having from 1 to 20 carbon atoms, R' is R or hydrogen, and y is an integer from 4 to 50.

The enumeration of alkyl, cycloalkyl and aryl radicals herein in defining the formulas is intended to include the various mixed radicals such as alkaryl, aralkyl, alkylcycloalkyl, cycloalkylaryl, and the like.

The organometal compounds suitable for use in the modification of the three component system so as to obtain the improved results of the instant invention are represented by the formula $MR_n$ where M is a Group I–A, II–A, III–A or IV–A metal (Periodic System of Lange, Handbook of Chemistry, 8th edition, pages 56–57), i.e., lithium, sodium, potassium, rubidium, cesium, beryllium, magnesium, calcium, strontium, barium, aluminum, gallium, indium, thallium, tin, lead, and germanium, R is an alkyl, cycloalkyl or aryl radical having from 1 to 20 carbon atoms, and n is the valence of M.

Examples of the MR$_n$ compounds that can be used are butyllithium, dicyclohexylmagnesium, triethylalumium, tetraphenyltin, hexylsodium, 2-naphthylpotassium, 3-cyclohexylbenzylrubidium, eicosylcesium, didodecylberyllium, di(4,5-dipentyl-1-naphthyl)calcium, di(3-methylcycloentpyl)stronitium, di(3 - cyclohexylphenyl)barium, tri(3 - phenanthryl)gallium, tri(4 - tetradecylcyclohexyl) indium, trioctylthallium, tetra(4,4-diphenylbutyl)germanium, tetraethyllead, triisobutylaluminum, and the like.

The compounds represented by the formula RAlX$_2$ and utilized as component A of the catalyst system are well known in the art. Examples are ethylaluminum dichloride, ethylalumium dibromide, ethylaluminum diiodide, n-propylaluminum dichloride, n-amylaluminum dibromide, tert-butylaluminum dichloride, eicosylaluminum diiodide, cyclohexylaluminum dichloride, phenylaluminum dichloride, 3-methylphenylaluminum dibromide, paratolylaluminum difluoride, 4-phenylcyclohexylaluminum difluoride, 3-propylbenzylamluminum dichloride, benzylaluminum diiodide, and 1-naphthylaluminum dichloride. Preferably, an alkylaluminum dichloride is used.

The titanium cholride-aluminum chloride complex utilized as component B of the catalyst system according to this invention is also well known in the art. It can be formed by reacting titanium tetrachloride with metallic aluminum. The complex can be represented by the formula TiCl$_3 \cdot \frac{1}{3}$AlCl$_3$.

Examples of the substituted silane compounds represented by the formula (RO)$_x$SiR'$_{4-x}$ and used as alternative component C–1 of the catalyst system are: butoxysilane, phenylmethoxysilane, trimethylethoxysilane, dimethyldiethoxysilane, diphenyldiethoxysilane, tetraethoxysilane, tricyclohexylphenoxysilane, dioctyldi(3-cyclopentyl-1 - naphthoxy)silane, eicsosyltri(3-phenylpropoxy)silane, benzyltri(3-methylcyclohexoxy)silane, 3 - phenylcyclopentyltridecoxysilane, and the like.

Triethylenediamine, which is used as alternative component C-2 of the catalyst system, is also known as 1,4-diazobicyclo(2.2.2)octane, and has the structure:

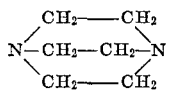

Examples of the phosphoramides represented by the formula (R$_2$N)$_3$P=O and used as alternative component C-3 of the catalyst system are:

tris(N,N-dimethyl)phosphoramide,
tris(N,N-dicyclopentyl)phosphoramide,
tris(N,N-dibenzyl)phosphoramide,
tris(N,N-dieicosyl)phosphoramide,
tris(N,N-di-4,5-dipentyl-2-naphthyl)phosphoramide,
tris(N,N-diphenyl)phosphoramide,
tris(N,N-diethyl)phosphoramide,
tris(N,N-diisobutyl)phosphoramide,
tris(N,N-di-3-octylphenyl)phosphoramide,
tris(N,N-di-2-phenylcyclohexyl)phosphoramide,
tris(N,N-di-(2-methylcyclopentyl)phenyl)phosphoramide,
and the like.

Examples of the onium halides represented by the formula R$_m$ZX and used as alternative component C-4 of the catalyst system are the quaternary ammonium halides recited in U.S. 3,147,241, diethyldiphenylammonium fluoride, dioctyldicyclohexylammonium bromide, tetramethylcyclopentylammonium cholride, phenyltribenzylammonium iodide, tetranaphthylammonium chloride, trioctadecyloxonium bromide, methylethylpropyloxonium chloride, benzyldimethyloxonium fluoride, triethyloxonlum chlo-
ride, triphenyloxonium iodide, tricyclohexyloxonium bromide, di(3-isobutylphenyl)cyclopentyloxonium chloride, ethylmethyloctadecylsulfonium iodide, triphenylsulfonium chloride, trieicosylsulfonium bromide, tri(2-naphthyl)sulfonium iodide, isopropylcyclohexylphenylsulfonium fluoride, ethyltriphenylphosphonium bromide, tridodecylbenzylphosphonium chloride, tetraethylphosphonium fluoride, tetramethylphosphonium iodide, and the like.

Examples of the amides having the formulas

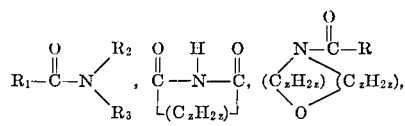

and

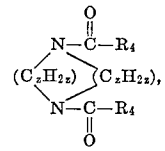

and used as alternative component C-5 of the catalyst system are N,N-dimethylformamide, N,N-dimethylacetamide, N,N-diethylacetamide, N-cyclohexylacetamide, N-t-butylbenzamide, N-methyl-N-phenylacetamide, N-benzylacetamide, n-heptamide, palmitamide, stearanilide, acetanilide, isobutyramide, N,N'-di-t-butylurea, tetramethylurea, succinimide, N,N,N'N'-tetramethyladipamide, N-methylisobutyramide, N-benzoylmorpholine, N,N'-diacetylpiperazine, n-butyloxamate, ethyloxanilate, ethyl carbamate, and the like.

Examples of the silazanes represented by the formulas R$_3$Si—NR'—SiR$_3$, (R$_3$Si)$_3$—N,

and R'(R$_2$SiNH)$_y$R', and used as alternative component C-6 of the catalyst system are:

hexamethyldisilazane,
N-propyl-hexaphenyldisilazane,
N-eicosyl-hexabenzyldisilazane,
N-isobutyl-hexamethylcyclohexyldisilazane,
hexaeicosyldisilazane,
hexa-o-tolyldisilazane,
hexa(2-naphthyl)disilazane,
nonacyclopentyltrisilazane,
nonamethyltrisilazane,
nonaethyltrisilazane,
nonamethlcyclohexyltrisilazane,
nonabenzyltrisilazane,
nona(3-phenylcyclohexyl)trisilazane,
nona(3,5-diethylphenyl)trisilazane,
octabenzyltrisildiazane,
N,N'-diisobutyl-octamethyltrisildiazane,
N,N'-diphenyloctacyclohexyltrisildiazane,
octamethyltrisildiazane,
octaethyltrisildiazane,
N,N'-dicyclopentyl-octaeicosyltrisildiazane,
polydiphenylsilazane ($x$=5),
polydimethylsilazane ($x$=4),
polydiethylsilazane ($x$=50),
polydicyclohexylsilazane ($x$=10),
polydibenzylsilazane ($x$=12),
polydi-p-tolylsilazane ($x$=20),
polydi(3-butylcyclohexyl)silazane ($x$=25),
polydi(6-cyclohexyldecyl)silazane ($x$=8),
polydi(4-cyclohexylphenyl)silazane ($x$=30),
polymethylethylsilazane ($x$=35),
polycyclohexylmethylsilazane ($x$=40),
polymethylphenylsilazane ($x$=45),
and the like.

Broad and preferred ranges for the molar ratio of the catalyst components are:

| | Broad | Preferred |
|---|---|---|
| RAlX$_2$:TiCl$_3$·⅓ AlCl$_3$ | 0.5:1–10:1 | 1:1–7·5:1 |
| Component C:TiCl·⅓ AlCl$_3$ | 0.25:1–7.5:1 | 0.5:1–5:1 |
| MR$n$:TiCl$_3$·⅓ AlCl$_3$ | 0.5:1–7·5:1 | 1:1–5:1 |

The polymerization reaction is carried out either in a mass system—i.e., the olefin being polymerized acts as reaction medium—or in an inert hydrocarbon diluent, such as a paraffin, cycloparaffin, or aromatic hydrocarbon having up to 20 carbon atoms per molecule. Examples of hydrocarbons that can be used are pentane, hexane, heptane, isooctane, eicosane, cyclohexane, methylcyclopentane, benzene, toluene, naphthalene, anthracene, and the like, and mixtures thereof. Where an inert diluent is used, the volume ratio of diluent to olefin is in the range of 1:1 to 10:1, preferably 3:1 to 7:1.

The polymerization is conducted at temperatures in the range −60 to 350° F., preferably 100 to 200° F. The pressure is sufficient to maintain the reaction mixture substantially in liquid phase. The reaction time is in the range 10 minutes to 50 hours, more frequently 30 minutes to 10 hours.

Although the invention is illustrated by the polymerization of propylene, any aliphatic olefin having up to 8 carbon atoms per molecule or mixtures thereof can be used, such as propylene, 1-butene, 1-pentene, 1-hexene, 3-methyl-1-butene, 4-methyl-1-pentene, 1-octene, and the like.

It is within the scope of the invention to use hydrogen in a concentration of about 0.08 to 0.50 mol percent of the olefin, calculated as the amount present in the liquid phase, for controlling the molecular weight of the polymer.

The following examples will further illustrate the invention, although it is not intended that the invention be limited thereto.

EXAMPLE I

Propylene was polymerized in a one-liter stirred reactor in 2.5-hour runs at 130° F. and 325 p.s.i.g. with 250 grams of propylene and 1 liter of hydrogen (equivalent to 0.17 mol percent hydrogen in the liquid phase) present in the reaction system.

| | Mol ratio [a] RAlX$_2$:Silazane:MR$_n$:TiCl$_3$·⅓ AlCl$_3$ | Total catalyst concn., wt. percent [b] | Rate, g./hr./g. Ti. complex | Xylenes Solubles, wt. percent [c] | Flexural modules p.s.i.×10$^{-3}$ [d] |
|---|---|---|---|---|---|
| Run No.: | | | | | |
| 1 | 5:5:0:1 | 0.658 | 97 | 6.4 | 179 |
| 2 | 5:5:1:1 | 0.697 | 158 | 4.0 | 221 |
| 3 | 5:2.5:0:1 | 0.487 | 43 | 6.3 | 192 |
| 4 | 5:2.5:1:1 | 0.542 | 99 | 3.2 | 22 |

[a] RAlX$_2$ is ethylaluminum dichloride; Silazane is hexamethyldisilazane; MR$_n$ is triethyl aluminum.
[b] Based on propylene.
[c] Determined by placing 0.95 g. of polymer in a centrifuge tube, adding 95 ml. mixed xylenes, heating for 15 minutes at 285° F., cooling, centrifuging, evaporating the solvent from a 25-ml. aliquot of the supernatant liquid, weighing the residue, and multiplying by 400.
[d] ASTM D790–61.

The above data demonstrate that the addition of a compound of the formula MR$_n$ results in an increase in productivity, a decrease in xylenes-solubles—i.e., amorphous polymer content of the polymer—and an increase in the flexural modulus of the polymer, as compared to the polymer prepared with a three component catalyst system.

EXAMPLE II

Propylene was polymerized in a one-liter stirred reactor in 2.5-hour runs at 130° F. and 325 p.s.i.g. with 250 grams of propylene and 1 liter of hydrogen (equivalent to 0.17 mol percent hydrogen in the liquid phase) present in the reaction system:

| Run No. | Mol ratio [a] RAlX$_2$:(RO)xSiR′$_{4-x}$:MR$_n$:TiCl$_3$·⅓AlCl$_3$ | (RO)SiR′$_{4-x}$ | Total catalyst concn., wt. percent [b] | Rate, g./g. Ti complex/ hr. | Flexural modulus, p.s.i.×10$^{-3}$ [c] | Xylene-soluble content, wt. percent [d] |
|---|---|---|---|---|---|---|
| 1 | 5:2.5:0:1 | Diphenyldiethoxylsilane | 0.598 | 54 | 191 | 7.2 |
| 2 | 5:2.5:1:1 | do | 0.653 | 88 | 217 | 4.6 |
| 3 | 5:1.25:0:1 | Tetraethoxysilane | 0.441 | 14 | | |
| 4 | 5:1.25:1:1 | do | 0.485 | 34 | 161 | 9.2 |
| 5 | 5:1.25:2:1 | do | 0.536 | 121 | 235 | 3.6 |

[a] RAlX$_2$ is ethylaluminum dichloride; MR$_n$ is triethylaluminum.
[b] Based on propylene.
[c] ASTM D790–61.
[d] Determined by placing 0.95 g. of polymer in a centrifuge tube, adding 95 ml. mixed xylenes, heating for 15 minutes at 285° F., cooling, centrifuging, evaporating the solvent from a 25-ml. aliquot of the supernatant liquid, weighing the residue, and multiplying by 400.

EXAMPLE III

Propylene was polymerized in a one-liter stirred reactor in 2.5-hour runs at 130° F. and 325 p.s.i.g. with 250 grams of propylene and 1 liter of hydrogen (equivalent to 0.17 mol percent hydrogen in the liquid phase) present in the reaction system:

| | Mol ratio [a] RAlX$_2$:TEDA MR$n$:TiCl$_3$·⅓ AlCl$_3$ | Total catalyst concn., wt. percent [b] | Rate, g./g. Ti complex/ hr. |
|---|---|---|---|
| Run No.: | | | |
| 1 | 5:2.5:0:1 | 0.438 | 105 |
| 2 | 5:2.5:1:1 | 0.483 | 241 |

[a] RAlX$_2$ is ethylaluminum dichloride; TEDA is triethylenediamine; MR$_n$ is triethylaluminum.
[b] Based on propylene.

The above data demonstrate that the addition of a compound of the formula MR$_n$ results in an increase in productivity of the catalyst system using only three components.

EXAMPLE IV

Propylene was polymerized in a one-liter stirred reactor in 2.5-hour runs at 130° F. and 325 p.s.i.g. with 250 grams of propylene and 1 liter of hydrogen (equivalent to 0.17 mol percent hydrogen in the liquid phase) present in the reaction system.

| | Mol ratio (a) | Total catalyst concn., wt. percent (b) | Rate, g./hr./g. Ti complex | Xylenes solubles, wt. percent (c) | Flexural modulus, p.s.i.×10⁻³ (d) |
|---|---|---|---|---|---|
| | RAlX₂:Amide: MRₙ:TiCl₃· ⅓ AlCl₃ | | | | |
| Run No. | | | | | |
| 1 | 5:5:0:1 | 0.557 | 37 | 7.4 | 160 |
| 2 | 5:5:1:1 | 0.620 | 103 | 3.5 | 209 |

ᵃ RAlX₂ is ethylaluminum dichloride; Amide is tetramethylurea; MRₙ is triethylaluminum.
ᵇ Based on propylene.
ᶜ Determined by placing 0.95 g. of polymer in a centrifuge tube, adding 95 ml. mixed xylenes, heating for 15 minutes at 285° F., cooling, centrifuging, evaporating the solvent from a 25-ml. aliquot of the supernatant liquid, weighing the residue, and multiplying by 400.
ᵈ ASTM D790–61.

The above data demonstrate that the addition of a compound of the formula $MR_n$ results in an increase in productivity, a decrease in the xylene-solubles—i.e., amorphous polymer content of the product—and an increase in the flexural modulus of the polymer.

EXAMPLE V

Propylene was polymerized in a one-liter stirred reactor in 2.5-hour runs at 130° F. and 325 p.s.i.g. with 250 grams of propylene and 1 liter of hydrogen (equivalent to 0.17 mol percent in the liquid phase) present in the reaction system.

| | Mol ratio (a) | Total catalyst concn., wt. percent (b) | Rate, g./hr./g. Ti complex | Xylenes solubles, wt. percent (c) | Flexural modulus, p.s.i.×10⁻³ (d) |
|---|---|---|---|---|---|
| | RAlX₂:(R₂N)₃ P=O:MRₙ: TiCl₃·⅓AlCl₃ | | | | |
| Run No.: | | | | | |
| 1 | 5:2.5:0:1 | 0.509 | 54 | 3.3 | 216 |
| 2 | 5:2.5:1:1 | 0.560 | 75 | 2.2 | 252 |
| 3 | 5:3.7:0:1 | 0.613 | 147 | 2.8 | 234 |
| 4 | 5:3.7:1:1 | 0.632 | 232 | 3.6 | 244 |

ᵃ RAlX is ethylaluminum dichloride: (R₂N)₃P=O is tris(N,N-dimethyl) phosphoramide; MRₙ is triethylaluminum in Runs 1 and 2 and diethylmagnesium in Runs 3 and 4.
ᵇ Based on propylene.
ᶜ Determined by placing 0.95 g. of polymer in a centrifuge tube, adding 95 ml. mixed xylenes, heating for 15 minutes at 285° F., cooling, centrifuging, evaporating the solvent from a 25-ml. aliquot of the supernatant liquid, weighing the residue, and multiplying by 400.
ᵈ ASTM D790–61.

The above data demonstrate that the addition of a compound of the formula $MR_n$ results in an increase in productivity, a decrease in xylene-solubles—i.e., amorphous polymer content of the product—and an increase in flexural modulus of the polymer.

EXAMPLE VI

Propylene was polymerized in a one-liter stirred reactor in 2.5-hour runs at 130° F. and 325 p.s.i.g. with 250 grams of propylene and 1 liter of hydrogen (equivalent to 0.17 mol percent hydrogen in the liquid phase) present in the reaction system:

| | Mol ratio (a) | Total catalyst concn., wt. percent (b) | Rate, g./hr./g. Ti complex |
|---|---|---|---|
| | RAlX₂:RₘZX: MRₙTiCl₃·⅓ AlCl₃ | | |
| Run No.: | | | |
| 1 | 2.5:1.25:0:1 | 0.436 | 13 |
| 2 | 2.5:1.25:1:1 | 0.476 | 30 |

ᵃ RAlX₂ is ethylaluminum dichloride; RₘZX is ethylmethyloctadecyl sulfonium iodide; MRₙ is triethylaluminum.
ᵇ Based on propylene.

The above data demonstrate that the addition of a compound of the formula $MR_n$ results in an increase in productivity of the catalyst system.

Reasonable variations and modifications of this invention can be made, or followed, in view of the foregoing disclosure, without departing from the spirit or scope thereof.

The above data demonstrate that the addition of a compound of the formula $MR_n$ results in an increase in productivity, a decrease in the xylenes-solubles, i.e., amorphous polymer content of the product, and an increase in the flexural modulus of the polymer, as compared to the properties of the polymer formed in the absence of the $MR_n$ compound.

We claim:
1. A catalyst system formed on admixing an organometal compound of the formula $MR_n$ wherein M is a metal of Group I–A, II–A, III–A and IV–A of the Periodic Table, n is the valence of M and R is a radical selected from the group consisting of alkyl, cycloalkyl and aryl having from 1 to 20 carbon atoms with a titanium trichloride-aluminum trichloride complex of the formula $TiCl_3 \cdot \frac{1}{3} AlCl_3$, an organoaluminum dihalide of the formula $RAlX_2$ wherein X is a halogen and R is a member of the group consisting of alkyl, cycloalkyl and aryl radicals having from 1 to 20 carbon atoms and a silazane selected from the group consisting of $R_3Si$—$NR'$—$SiR_3$, $(R_3Si)_3$—N, $R_3Si$—$NR'$—$SiR_2$—$NR'$—$SiR_3$ and

$$R'(R_2SiNH)_yR'$$

wherein R is a member of the group consisting of alkyl, cycloalkyl and aryl radicals having from 1 to 20 carbon atoms, R' is R or hydrogen and y is an integer from 4 to 50, and wherein the molar ratio of said $RAlX_2$ compound to said $TiCl_3 \cdot \frac{1}{3} AlCl_3$ compound is in the range of 0.5:1 to 10:1, the molar ratio of said silazane compound to said $TiCl_3 \cdot \frac{1}{3} AlCl_3$ compound is in the range of 0.25:1 to 7.5:1 and the molar ratio of said $MR_n$ compound to said $TiCl_3 \cdot \frac{1}{3} AlCl_3$ compound is in the range of 0.5:1 to 7.5:1 and wherein the molar ratio of said $RAlX_2$ compound to said $MR_n$ compound is in the range of 5:1 to 5:2.

2. A catalyst system according to claim 1 wherein said silazane is selected from the group consisting of hexamethyldisilazane, N-propyl-hexaphenyldisilazane, N-eicosyl-hexabenzyldisilazane, N-isobutyl-hexamethylcyclohexyldisilazane, hexaeicosyldisilazane, hexa-o-tolyldisilazane, hexa(2-naphthyl)disilazane, nonacyclopentyltrisilazane, nonamethyltrisilazane, nonaethyltrisilazane, nonamethylcyclohexyltrisilazane, nonabenzyltrisilazane, nona(3-phenylcyclohexyl)trisilazane, nona(3,5 - diethylphenyl)trisilazane, octabenzyltrisildiazane, octamethyltrisildiazane, octaethyltrisildiazane, N,N'-diphenyloctacyclohexyltrisildiazane, N,N'-dicyclopentyl-octaeicosyltrisildiazane polydiphenylsilazane, polydimethylsilazane, polydiethylsilazane, polydicyclohexylsilazane, polydibenzylsilazane, polydi-p-tolylsilazane, polydi(3-butylcyclohexyl)silazane, polydi-(6-cyclohexyldecyl)silazane, polydi(4-cyclohexylphenyl)silazane, polymethylethylsilazane, polycyclohexylmethylsilazane, and polymethylphenylsilazane.

3. A catalyst system according to claim 1 formed by admixing ethylaluminum dichloride, triethylaluminum, hexamethyldisilazane and titanium trichloride-aluminum trichloride complex.

4. A process which comprises polymerizing an aliphatic 1-olefin having from 3 to 8 carbon atoms per molecule in the presence of a catalyst which forms on mixing an organometal compound of the formula $MR_n$ wherein M is a metal of Group I-A, II-A, III-A and IV-A of the Periodic Table, $n$ is the valence of M and R is a radical selected from the group consisting of alkyl, cycloalkyl and aryl having from 1 to 20 carbon atoms with a titanium trichloride-aluminum trichloride complex of the formula $TiCl_3 \cdot \frac{1}{3}AlCl_3$, an organoaluminum dihalide of the formula $RAlX_2$ wherein X is a halogen and R is a member of the group consisting of alkyl, cycloalkyl and aryl radicals having from 1 to 20 carbon atoms and a silazane selected from the group consitsing of $R_3Si$—$NR'$—$SiR_3$, $(R_3Si)_3$—N, $R_3Si$—$NR'$—$SiR_2$—$NR'$—$SiR_3$ and

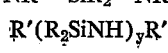

wherein R is a member of the group consisting of alkyl, cycloalkyl and aryl radicals having from 1 to 20 carbon atoms, R' is R or hydrogen and $y$ is an integer from 4 to 50, and wherein the molar ratio of said $RAlX_2$ compound to said $TiCl_3 \cdot \frac{1}{3}AlCl_3$ compound is in the range of 0.5:1 to 10:1, the molar ratio of said silazane compound to said $TiCl_3 \cdot \frac{1}{3}AlCl_3$ compound is in the range of 0.25:1 to 7.5:1 and the molar ratio of said $MR_n$ compound to said $TiCl_3 \cdot \frac{1}{3}AlCl_3$ compound is in the range of 0.5:1 to 7.5:1 and wherein the molar ratio of said $RAlX_2$ compound to said $MR_n$ compound is in the range of 5:1 to 5:2.

5. A process according to claim 4 wherein the catalyst is formed by admixing ethylaluminum dichloride, triethylaluminum, hexamethyldisilazane and titanium trichloride-aluminum trichloride complex.

No references cited.

JOSEPH L. SCHOFER, Primary Examiner

S. M. LEVIN, Assistant Examiner

U.S. Cl. X.R.

252—429; 260—94.9

UNITED STATES PATENT OFFICE
CERTIFICATE OF CORRECTION

Patent No. 3,554,993                    Dated January 12, 1971

Inventor(s) Charles W. Moberly et al.

It is certified that error appears in the above-identified patent and that said Letters Patent are hereby corrected as shown below:

Column 10, line 18, cancel "No references cited" and insert

References Cited
UNITED STATES PATENTS

| | | | |
|---|---|---|---|
| 2,980,664 | 4/1961 | Stuart | 260-93.7 |
| 2,991,157 | 7/1961 | Orzechowski et al | 23-230 |
| 3,010,787 | 11/1961 | Tornquist | 260-94.9 |
| 3,088,942 | 5/1963 | Coover | 260-93.7 |
| 3,099,647 | 7/1963 | Jeyl et al | 260-93.7 |
| 3,189,590 | 6/1965 | Coover, Jr. et al | 260-93.7 |
| 3,213,073 | 10/1965 | Langer | 260-93.7 |
| 3,269,996 | 8/1966 | Bayer et al | 260-93.7 |

FOREIGN PATENTS

| | | |
|---|---|---|
| 827,516 | 2/1960 | Great Britain |
| 836,333 | 6/1960 | Great Britain |

OTHER REFERENCES

Organo-Metallic Chemistry, (Feiss) ACS Monograph No. 147, Reinhold (1960) pp. 203-204

Signed and sealed this 25th day of May 1971.

(SEAL)
Attest:

EDWARD M. FLETCHER, JR.          WILLIAM E. SCHUYLER, JR.
Attesting Officer                 Commissioner of Patents